(12) United States Patent
Rehfus et al.

(10) Patent No.: US 9,328,809 B2
(45) Date of Patent: May 3, 2016

(54) BALLSCREW ASSEMBLY HAVING A LOW FRICTION SLEEVE

(71) Applicant: Goodrich Corporation, Charlotte, NC (US)

(72) Inventors: Kevin Rehfus, Troy, OH (US); David Drennen, Bellbrook, OH (US); Harald Klode, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 546 days.

(21) Appl. No.: 13/854,561

(22) Filed: Apr. 1, 2013

(65) Prior Publication Data

US 2014/0290409 A1    Oct. 2, 2014

(51) Int. Cl.

| | |
|---|---|
| *F16H 25/20* | (2006.01) |
| *F16H 25/22* | (2006.01) |
| *F16H 25/24* | (2006.01) |
| *F16D 65/18* | (2006.01) |
| *F16D 125/40* | (2012.01) |

(52) U.S. Cl.
CPC ............ *F16H 25/2204* (2013.01); *F16H 25/24* (2013.01); *F16D 65/18* (2013.01); *F16D 2125/40* (2013.01); *F16H 2025/204* (2013.01); *F16H 2025/2031* (2013.01); *F16H 2025/249* (2013.01); *F16H 2025/2481* (2013.01); *Y10T 29/49826* (2015.01); *Y10T 74/19744* (2015.01)

(58) Field of Classification Search
CPC ................ F16H 25/2204; F16H 25/24; F16H 2025/204; F16H 2025/2031; Y10T 74/19744
See application file for complete search history.

(56) References Cited

U.S. PATENT DOCUMENTS

| 4,199,999 | A  | * | 4/1980 | Metz ................... F16H 25/2233 |
|---|---|---|---|---|
| | | | | 74/424.9 |
| 2007/0137350 | A1 | * | 6/2007 | Tateishi ................... B23G 1/16 |
| | | | | 74/424.87 |
| 2007/0144281 | A1 | * | 6/2007 | Inoue et al. ................... 74/89.23 |
| 2007/0169578 | A1 | * | 7/2007 | Christensen ........ F16H 25/2021 |
| | | | | 74/89.37 |
| 2009/0260463 | A1 | * | 10/2009 | Fukano ............... F16H 25/2454 |
| | | | | 74/89.33 |

FOREIGN PATENT DOCUMENTS

| WO | 9942739 | 8/1999 |
|---|---|---|
| WO | 2004099644 | 11/2004 |

OTHER PUBLICATIONS

Extended European Search Report dated Nov. 20, 2015 in European Application No. 14162034.4.

* cited by examiner

*Primary Examiner* — William C Joyce
(74) *Attorney, Agent, or Firm* — Snell & Wilmer L.L.P.

(57) ABSTRACT

A ballscrew assembly may include a ballnut configured to combat the negative effects of thermal expansion of dissimilar materials used within the ballscrew assembly. Moreover, the ballscrew assembly described herein may have a decreased coefficient of friction as compared with a steel on steel housing and ballnut configuration. A ballscrew assembly may comprise a ballnut made from a first material, a ballnut housing made from a second material, and a sleeve made from a third material. The sleeve may be positioned between the exterior of the ballnut and an interior of the ballnut housing to reduce friction between the exterior surface of the ballnut and an interior surface of the ballnut housing.

20 Claims, 3 Drawing Sheets

BALLSCREW ASSEMBLY HAVING A LOW FRICTION SLEEVE

FIELD

The present disclosure is related to a ballscrew assembly, and more particularly, to a ballscrew assembly for use in an aircraft brake.

BACKGROUND

Aircraft brakes often include a ballscrew. A ballscrew typically converts rotational motion into translational motion by driving a translating ballnut. In an aircraft brake, the ballnut may (either directly or through other components) drive a brake stack into frictional engagement. As is described herein, conventional ballscrew assemblies may comprise a ballscrew and a housing.

Aircraft are sensitive to weight restrictions as each pound of extra weight affects fuel consumption and efficiency of the aircraft. It is desirable to reduce the weight of the ballscrew assembly while retaining the robust nature of the ballscrew.

Also, aircraft experience large temperature swings, for example, between ground temperatures and in-flight temperatures. Dissimilar materials may react differently when exposed to these temperatures. For instance, materials often experience thermal expansion and contraction when introduced to temperature changes. A metal-on-metal ballnut and ballnut housing of different materials may seize up or scrape due to this thermal expansion. A metal-on-metal ballnut and ballnut housing may also experience excessive wear since those materials are not optimized for their tribological properties.

SUMMARY

The present disclosure relates to a ballscrew assembly designed to address, among other things, the aforementioned deficiencies in prior art ballscrew assemblies. Systems and methods disclosed herein may be useful in connection with a ballscrew assembly. A ballscrew assembly may be configured to combat thermal expansion of dissimilar materials used within the assembly. Moreover, the ballscrew assembly described herein may have a decreased coefficient of friction as compared with a steel-on-steel housing and ballnut configuration.

A ballscrew assembly is provided comprising a ballnut made from a first material, a ballnut housing made from a second material, and a sleeve made from a third material. The sleeve may be positioned between the exterior of the ballnut and the interior surface of the ballnut housing to reduce friction between the exterior surface of the ballnut and an interior surface of the ballnut housing. The sleeve may have an exterior anti-rotation tab to be inserted into a housing void to restrict rotation between the sleeve and the housing. The sleeve may have at least one slot configured to communicate with an anti-rotation tab of the ballnut. Similarly, the ballnut may have an anti-rotation tab configured to communicate with a slot of the sleeve to hold the ballnut from rotating relative to the sleeve. This anti-rotation tab may also restrict the ballnut from being inadvertently removed from the housing.

A method of manufacture of a ballscrew assembly is also disclosed herein. This method may include coupling a sleeve made from a third material within a ballnut housing made from a second material, and inserting a ballnut made from a first material within an aperture of the sleeve. The sleeve may be configured to restrict the negative effects of thermal expansion of the dissimilar first material and the second material. Thus, the friction between the ballnut exterior surface and the housing interior surface tends to be reduced.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for ballscrew assemblies. Although the embodiments herein are described with reference to ballscrew assemblies used in connection with aircraft brakes, such embodiments are provided for example only as it is contemplated that the disclosures herein have applicability to other vehicles, such as automobiles and/or moving heavy machinery. A ballscrew assembly may apply load to a brake stack, such as via an electromechanical actuator (EMA). Ballscrew assemblies contemplated herein may be configured to have an operating temperature between −65 to 450 degrees Fahrenheit (−53.89 to 232.22 degrees Celsius).

Figure 1:
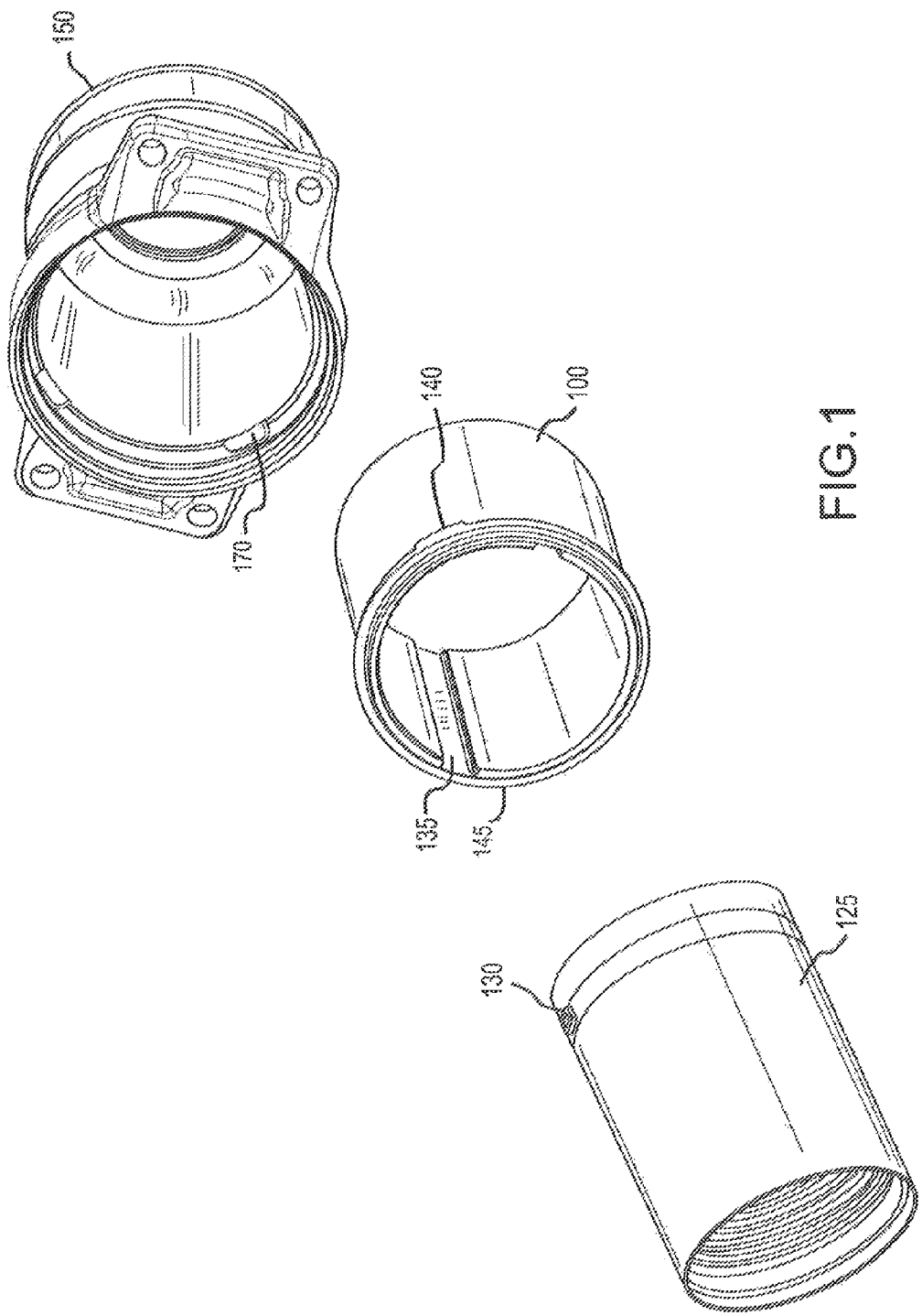
FIG. 1 illustrates an exploded view of an exemplary ballscrew assembly in accordance with various embodiments.

In this regard, and with reference to FIG. 1, a ballscrew assembly 101 is provided in various embodiments comprising a ballnut 125, a housing 150, and a sleeve 100. Sleeve 100 may be configured to provide a low friction interface between ballnut 125 and housing 150. Ballnut 125 may comprise a casing having threading and/or an interior channel for a bearing to assist with driving ballnut 125. As is common in the industry, references to a ballscrew, and/or a ballscrew assembly herein may be referring to ballnut 125. According to various embodiments, housing 150 may be made from a first material, such as a metal. For example, housing 150 may be made from aluminum or steel. For instance, housing 150 may be made from an aluminum alloy, such as 2014-T6 aluminum. This may reduce the weight of housing 150 as compared with a steel housing. Ballnut 125 may be made from a second material, such as steel. Though it may be made from any variety of steel, ballnut 125 may be made from type 440C stainless steel hardened to 58-62 HRC Rockwell scale of hardness. The second material may have a different coefficient of thermal expansion than the first material. Sleeve 100 may be made from a third material, such as poly-imide or an imide monomer material. According to various embodiments, the material of sleeve 100 may comprise a coefficient of thermal expansion greater than the coefficient of thermal expansion of the first material but less than the second material. For instance, the material of sleeve 100 may comprise a coefficient of thermal expansion greater than the coefficient of thermal expansion of aluminum but less than the coefficient of thermal expansion of steel. The sleeve 100 may also enable an increase in clearance between ballnut 125 and the sleeve 100 for thermal clearance requirements without a compromise to its bearing performance during actuation. Sleeve 100 may be made from a deformable material. For instance, this deformable material may be configured to assist axial movement of ballnut 125. In this case, axial movement may refer to movement of ballnut 125 in a direction substantially parallel to and/or aligned with the center axis of the opening of sleeve 100.

Sleeve 100 may be formed in any suitable shape. Sleeve 100 may be made from any number of parts. According to various embodiments, sleeve 100 may comprise a generally tubular shape. Sleeve 100 may comprise a first open interior diameter sized to receive ballnut 125. This interior diameter may be a constant diameter throughout the length of the sleeve. The interior of sleeve 100 may be shaped to mirror the exterior ballnut 125. The exterior of sleeve 100 may be shaped to mirror the interior of housing 150. According to various embodiments, sleeve 100 comprises at least one linear slot 135. Linear slot 135 controls the rotational position of ballnut 125 during linear travel of ballnut 125 and restrict rotation of ballnut 125 within sleeve 100 and/or housing 150. If ballnut 125 were allowed to rotate while translating, EMA position control may be compromised and/or desired clamping force levels may not be achieved. Linear slot 135 may comprise a generally rectangular cross section and run the length of sleeve 100. As used herein, "prevent" may include full prevention, fully restricting and/or partially restricting.

Ballnut 125 may comprise an anti-rotation mechanism, such as an anti-rotation tab 130, for restricting ballnut 125 from rotating relative to sleeve 100 and/or housing 150. For instance, anti-rotation tab 130 may communicate with linear slot 135 to restrict ballnut 125 from rotating. For instance, anti-rotation tab 130 may travel linearly/axially along linear slot 135 as ballnut 125 moves in a linear direction within sleeve 100. Linear/axial movement may refer to movement of anti-rotation tab 130 in a direction substantially parallel to the center axis of ballscrew assembly 101 and generally through the center of the opening of sleeve 100.

Anti-rotation tab 130 may comprise a raised surface of ballnut 125. Anti-rotation tab 130 may be located towards a distal end of ballnut 125. Ballscrew assembly 101 may comprise a number of anti-rotation tab 130. Anti-rotation tab 130 may be configured to withstand about 300 pounds (about 136.078 kilograms) of reaction force.

Anti-rotation tab 130 may be any width. In accordance with various embodiments, the width of anti-rotation tab 130 is sized to generally mirror the interior width of linear slot 135. Though anti-rotation tab 130 is depicted in FIG. 1 as a single rectangular shaped raised surface, it may be any desired quantity of any desired shape such as rounded, trapezoidal and/or the like. Anti-rotation tab 130 may be integral to ballnut 125 or anti-rotation tab 130 may be coupled to ballnut 125 by any suitable means.

In another embodiment, the anti-rotation feature may be realized by giving the outside diameter of ballnut 125 a substantially oval shape or other non-cylindrical shape and replacing linear slot 135 in sleeve 100 with a matching oval surface or other non-cylindrical surface on the inside diameter of sleeve 100.

According to various embodiments, an anti-rotation element may be a raised surface on the interior of sleeve 100. This raised surface may communicate with a groove and/or slot in the exterior of the ballnut. According to various embodiments, in lieu of and/or in addition to anti-rotation tab 130, a floating member, such as a tab or bearing, may be configured to travel within and between a slot in the exterior of ballnut 125 and a slot in the interior of sleeve 100, such as linear slot 135. According to various embodiments, sleeve 100 may comprise a first section and a second section made of two separate parts. The first section may have a "C" shape and the second section may have a "C" shape. These sections may be placed within housing 150. A gap between each generally "C" shaped may form a slot, similar to the purpose of linear slot 135 for anti-rotation tab 130 to travel within. As previously mentioned, sleeve 100 may comprise multiple sections and segments. For instance, though sleeve 100 is depicted as traveling the depth of housing 150 and/or the length of ballnut 125, it may, in various embodiments, be a portion of this length. For instance, according to various embodiments, sleeve 100 may be as long as the expected length of travel of ballnut 125.

Figure 3:
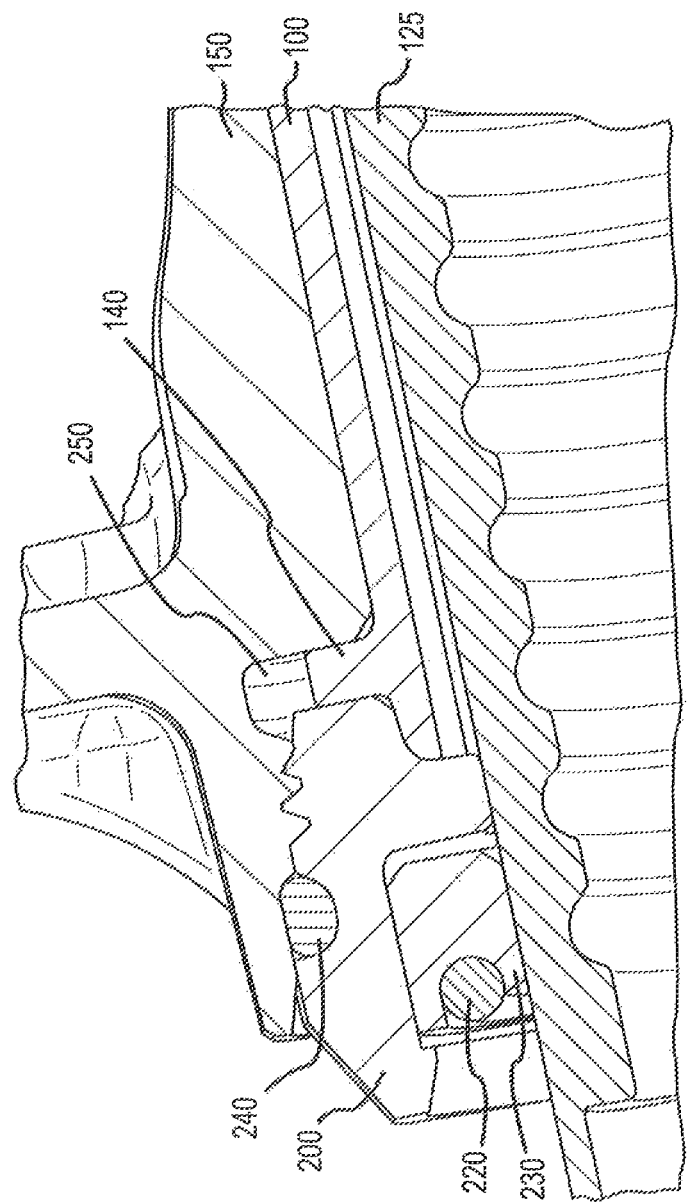
FIG. 3 illustrates an enlarged view of the cut-away view of FIG. 2, in accordance with various embodiments.

Anti-rotation tab 130 may function as a forward stop to retain ballnut 125 within housing 150, for instance to restrict foreign object damage to aircraft should the brake stack be compromised or not be in proper position during forward ball nut extension. According to various embodiments, anti-rotation tab 130 may make contact with a portion of housing 150 or an element coupled to housing 150, such as nut 200 (described further below and as depicted in FIG. 3) and restricts further axial movement of ballnut 125.

Sleeve 100 may also comprise an anti-rotation mechanism for restricting sleeve 100 from rotating relative to housing 150. With renewed reference to FIG. 1, sleeve 100 may comprise an anti-rotation tab 140 configured to interface with an anti-rotation groove 170 in housing 150. Though this anti-rotation mechanism may be located in any desired location, in accordance with the embodiment as depicted in FIG. 1, at least one anti-rotation tab 140 is located on a lip 145 of the opening of sleeve 100. Each anti-rotation tab 140 is configured to nest with a corresponding antirotation groove 170 on the mouth of housing 150. This arrangement restricts rotation of sleeve 100 relative to housing 150. Alternatively, sleeve 100 may be friction fit into housing 150. In various embodiments, sleeve 100 may be secured to housing 150 via a fastener. In various embodiments, sleeve 100 may be bonded to housing 150 via adhesive and/or epoxy.

According to various embodiments, a portion of the opening of sleeve 100 may comprise a non-cylindrical shape designed to interface with a well on housing 150 with a compatible non-cylindrical shape to restrict rotation of sleeve 100 within housing 150.

According to various embodiments, sleeve 100 is configured to provide an improvement in the reduction of the friction experienced as compared with a steel-on-steel embodiment. For instance, sleeve 100 may provide an order of magnitude reduction in the value of the coefficient of friction between housing 150 and ballnut 125 as compared with a steel housing and a steel ballnut.

According to various embodiments, the material of sleeve 100 is configured to account for the different coefficients of thermal expansion of the materials of the ballscrew assembly 101. As stated above, an electromechanical actuator (EMA) of an aircraft may be exposed to a large range of temperatures, such as about −55 degrees Fahrenheit to 350 degrees Fahrenheit (−48.33 degrees Celsius to 176.667 degrees Celsius). Sleeve 100 may allow for a reduction in part tolerances with reduced danger of seizing and/or breakage/cracking from dissimilar part expansions/contractions. Sleeve 100 material is configured to be capable of operation up to 600 degrees Fahrenheit (315.556 Celsius).

Sleeve 100 material may be made from a low friction material so that ballnut 125 can move in and out of housing 150 easily, which creates an efficient EMA. Higher efficiency tends to result in lower power draw, smaller package size, less weight, and higher reliability of the EMA. As the friction between ballnut 125 and housing 150 is reduced, a smaller motor in the EMA may be utilized. This reduces weight of the aircraft. Also, a smaller motor tends to result in a reduction of power needed to drive the motor. This tends to reduce energy storage needs. By reducing metal to metal contact, ballscrew assembly 101 lifespan tends to be increased thereby increasing system reliability. According to various embodiments, the use of sleeve 100 provides an order of magnitude reduction in the coefficient of friction (for instance about a 0.06 to about a 0.14 coefficient of friction) as compared to use of a steel ballnut within a steel housing design which has about 0.6 to 0.15 coefficient of friction. This lower friction also accommodates larger misalignments of ballnut 125 to housing 150 without binding of the EMA (i.e. better back-drive capability). This also leads to improved system reliability. Sleeve 100 may be self-lubricating. For instance the material of sleeve 100 may be impregnated with a lubricant which serves to create a low friction interface. For example, a fully synthetic grease such as AEROSHELL Grease 22, made by Royal Dutch Shell PLC, may be used in various embodiments. The fully synthetic grease may be designed for severe operating conditions including high bearing loads, high speeds and where long grease retention and high water resistance are desirable. The fully synthetic grease may comprise a synthetic base oil and non-melting inorganic thickener. This impregnated lubricant may replenish itself as needed. While a secondary lubricating agent may be added to elements of ballscrew assembly 101, the need for secondary lubricating agents (e.g. AEROSHELL, Grease 22) may be reduced or removed, which reduces weight of ballscrew assembly 101. This also reduces maintenance needs of ballscrew assembly 101.

Friction from ballnut 125 side loading may be reduced with the use of sleeve 100. Sleeve 100 allows a greater tolerance gap between ballnut 125 and housing 150. This allows for increased machining tolerances between housing 150 interior diameter (bore) and ballnut 125 exterior diameter, which therefore lowers component manufacturing costs.

Sleeve 100 material may be non-metallic. Thus, sleeve 100 may be substantially impervious to corrosion. In the event of extended run time, sleeve 100 may easily be replaced within the EMA assembly, such as out of housing 150, if excess wear conditions are experienced. However, the material of sleeve 100 has a high resistance to wear due to low friction values it experiences. The material of sleeve 100 is also a low weight material in comparison to metal alternatives.

As previously mentioned, ballscrew assembly 101 can be used as a forward stop thus creating a maximum extension condition and therefore restricting possible foreign object damage on the runway. Sleeve 100 material may also provide thermal advantages to protect the internal EMA components (e.g. electronics) from harmful excessive brake heat. Sleeve 100 material also provides vibration dampening advantages to the internal components as well as reduced external noise.

Often times, EMAs in operation experience side loads. A side load is a nonlinear load or a load experienced by the EMA outside of the axis of ballscrew assembly 101. Sleeve 100 may aid with the absorption of side loads as compared with a steel on steel ballnut and housing configuration. For instance, with a steel on steel ballnut and housing configuration side loads may create scraping between the ballnut and housing. Sleeve 100 may encourage sliding in response to side loads due to the reduced coefficient of friction sleeve 100 provides.

Figure 2:
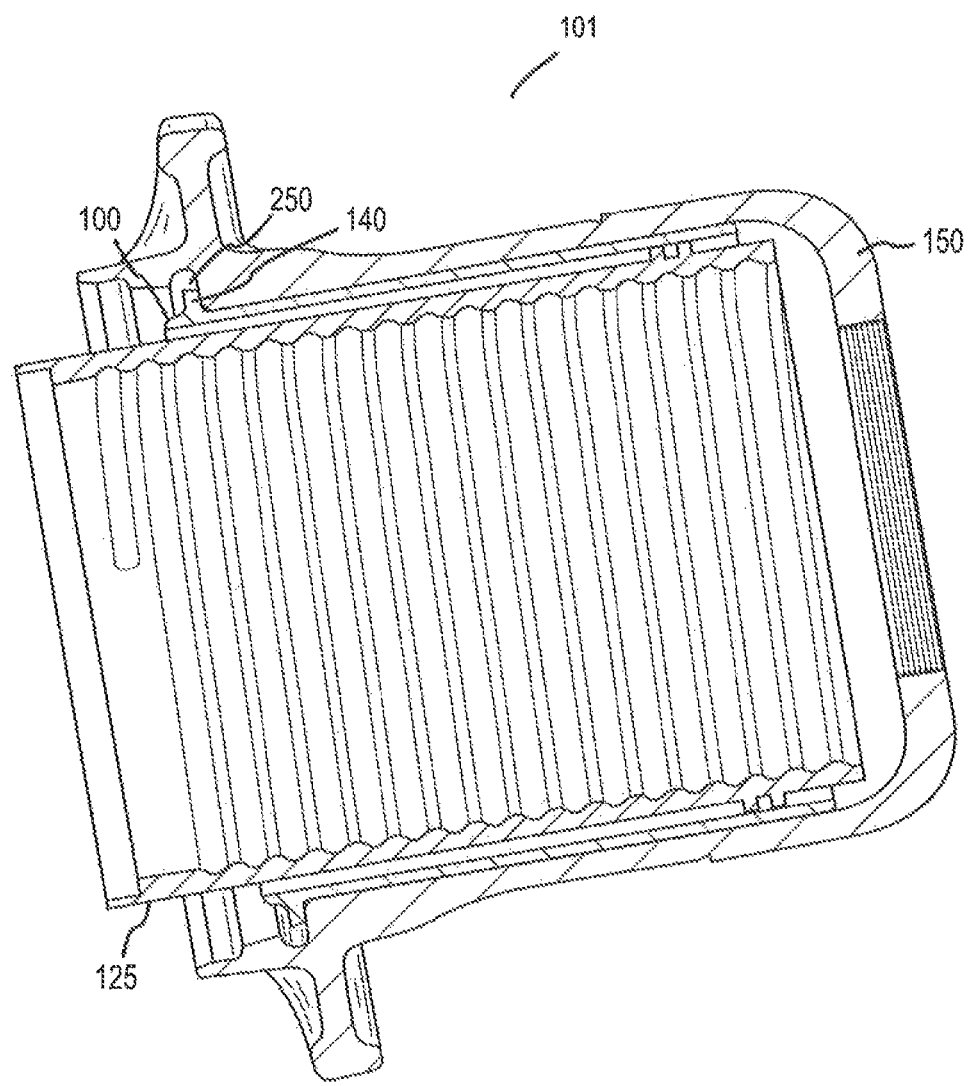
FIG. 2 illustrates a cut-away view of a ballscrew assembly in accordance with various embodiments.

In accordance with various embodiments, and with reference to FIG. 2, ballscrew assembly 101 is shown. Ballscrew assembly 101 is shown in a cut away view. Ballnut 125 of FIG. 2 is depicted as having a substantially cylindrical or cylindrical, although other geometric configurations are contemplated herein. It should be understood that the substantially cylindrical or cylindrical ballnut 125 has an axis running from the proximal end of ballnut 125 to the distal end of ballnut 125. In an embodiment, ballnut 125 may comprise axially distributed grooves on its interior surface. A rolling element, such as a ball, may communicate with the axially distributed grooves.

Sleeve 100 may be inserted into housing 150 with anti-rotation tab 140 interfacing with anti-rotation grove 170. Sleeve 100 may comprise a lip 145 normal to the axis of sleeve 100 around its circumference. Lip 145 may be positioned within a counter bore aperture 250 configured to receive lip 145 of sleeve 100.

With reference to FIG. 3, in addition to anti-rotation elements, a nut 200 may be threaded and may secure sleeve 100 to housing 150. For instance, a portion of nut 200 may secure, such as through friction, lip 145 of sleeve 100. Nut 200 may be made from any desired material, for example, nut 200 may be an aluminum nut. Nut 200 is in communication with anti-rotation tab 130, which may restrict ballnut 125 from traveling out of housing 150. For instance, as ballnut 125 travels in a path linearly parallel to the center axis of ballscrew assembly 101, generally within linear slot 135, it may be prevented from exiting housing 150 in response to anti-rotation tab 130 coming into contact with nut 200. Thus, the placement of anti-rotation tab 130 along the exterior surface of ballnut 125 may be determined based on the desired length of travel not be exceeded by ballnut 125.

With continued reference to FIG. 3, a close-up of ballscrew assembly 101 as depicted in FIG. 2 is presented. A static seal/gasket, such as an O ring 240 may be inserted between nut 200 and housing 150. Housing 150 may comprise female threading configured to interact with male threading of nut 200. As nut 200 is removed, O-ring 240 may become dislodged from its position within a counter bore of housing 150. This may aid in maintenance of O ring 240, for instance, if replacement of O ring 240 is needed. A dynamic seal 230 may be coupled to nut 200 due to the relative motion between nut 200 and ballnut 125. O-ring 240 and/or dynamic seal 230 may assist with restricting debris and water from entering portions of ballscrew assembly 101. A spring 220 may lock dynamic seal 230 in position. By removing nut 200, sleeve 100 may be removed and/or replaced while other portions of ballscrew assembly 101 may be retained. According to various embodiments, sleeve 100 may be integral to nut 200 and/or have threading to retain sleeve 100 within housing 150.

The present disclosure relates to a ballscrew assembly designed to address, among other things, various needs. For instance, according to various embodiments, the sleeve may include an anti-rotation mechanism to hold the sleeve in position within the housing. The sleeve may be configured to restrict thermal expansion of the first material and the second material from increasing the friction experienced between the ballnut exterior surface and the housing interior surface. The sleeve may be configured to redirect side-loading of the ballscrew assembly. For instance, due to the reduction in the coefficient of friction between elements, the negative effects of undesirable side-loading may be reduced. Use of the sleeve may reduce tolerance requirements of aspects of the ballscrew assembly. For instance, the tolerance requirements of the interior diameter of the housing and/or the outer diameter of the ballnut may be reduced. The sleeve may be substantially impervious to corrosion. The sleeve may be semi-permanent, removable and/or replaceable. The sleeve may be self-lubricating. The sleeve may protect internal components from brake heat. The sleeve may provide dampening to internal components. The sleeve may provide a reduction in the level of noise in the operation of the electromechanical actuator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises as list of elements does not include only those elements but may include other elements not expressly listed or inherent to such process, method, article, or apparatus.

The invention claimed is:

1. A ballscrew assembly comprising:
ballnut comprising a first material;
a ballnut housing comprising a second material, wherein the first material and the second material are different materials; and
a sleeve comprising a third material positioned between an exterior surface of the ballnut and an interior surface of the ballnut housing,
wherein the sleeve is made from a deformable material configured to assist axial movement of the ballnut,
wherein at least one of a portion of the ballnut housing or an element coupled to the ballnut housing is configured to axially secure the sleeve to the ballnut housing and restrict axial movement of the ballnut out of the ballnut housing.

2. The ballscrew assembly of claim 1, wherein the sleeve further comprises a slot configured to communicate with an anti-rotation tab of the ballnut.

3. The ballscrew assembly of claim 1, wherein the ballnut further comprises an anti-rotation tab configured to communicate with a slot of the sleeve to restrict the ballnut from rotating relative to the sleeve.

4. The ballscrew assembly of claim 3, wherein in response to the anti-rotation tab being in mechanical communication with a nut, the ballnut is prevented from being separated from the ballnut housing.

5. The ballscrew assembly of claim 1, wherein the sleeve further comprises an anti-rotation mechanism to hold the sleeve in position within the ballnut housing.

6. The ballscrew assembly of claim 1, wherein the sleeve is configured to reduce negative effects of thermal expansion of the first material and of the second material between the exterior surface of the ballnut and an interior surface ballnut housing.

7. The ballscrew assembly of claim 1, wherein the sleeve is configured to redirect side-loading of the ballscrew assembly.

8. The ballscrew assembly of claim 1, wherein the sleeve is configured to reduce tolerance requirements of an interior diameter of the ballnut housing and an outer diameter of the ballnut.

9. The ballscrew assembly of claim 1, wherein the sleeve is resistant to corrosion.

10. The ballscrew assembly of claim 1, wherein the sleeve is removable.

11. The ballscrew assembly of claim 1, wherein the sleeve is self-lubricating.

12. The ballscrew assembly of claim 1, wherein the sleeve protects internal components of the ballscrew assembly from brake heat.

13. The ballscrew assembly of claim 1, wherein the sleeve provides vibrational dampening to internal components of the ballscrew assembly.

14. The ballscrew assembly of claim 1, wherein the sleeve provides a reduction in a level of noise during operation of the ballscrew assembly.

15. The ballscrew assembly of claim 1, wherein the first material comprises steel and the second material comprises aluminum.

16. The ballscrew assembly of claim 1, wherein the third material comprises at least one of a poly-imide material and an imide monomer material.

17. The ballscrew assembly of claim 1, wherein the ballscrew assembly is disposed in an electromechanical actuator.

18. An apparatus comprising:
a sleeve made from a third material,
wherein the sleeve is positioned between an exterior of a ballnut comprising a first material and an interior of a ballnut housing comprising a second material,
wherein the first material and the second material are different materials, wherein the third material comprises a coefficient of thermal expansion greater than the coefficient of thermal expansion off the first material,
wherein the third material comprises a coefficient of thermal expansion less than the coefficient of thermal expansion of the second material, and
wherein the ballnut travels axially along at least one slot integral to the sleeve,
wherein at least one of a portion of the ballnut housing or an element coupled to the ballnut housing is configured to axially secure the sleeve to the ballnut housing and restrict axial movement of the ballnut out of the ballnut housing.

19. A method of manufacture of a ballscrew assembly comprising:
disposing a sleeve comprising a third material within a ballnut housing comprising a second material; and
inserting a ballnut comprising a first material within an aperture of the sleeve,
wherein the second material and the first material are different materials,
wherein the sleeve has a coefficient of friction less than the coefficient of friction of at least one of the first material and the second material,
wherein at least one of a portion of the ballnut housing or an element coupled to the ballnut housing is configured to axially secure the sleeve to the ballnut housing and restrict axial movement of the ballnut out of the ballnut housing.

20. The method of manufacture of claim 19, wherein inserting the ballnut comprises configuring the ballnut to travel axially along a slot integral to the sleeve.

* * * * *